United States Patent
Bell et al.

(10) Patent No.: US 10,252,811 B2
(45) Date of Patent: Apr. 9, 2019

(54) ACOUSTIC CONTROLLED ICE DEFLECTING AUXILIARY POWER UNIT INLET SYSTEM

(71) Applicant: United Technologies Corporation, Hartford, CT (US)

(72) Inventors: Melissa A. Bell, San Diego, CA (US); Michael J. Rollins, Santee, CA (US); Behzad Hagshenas, San Diego, CA (US); Jack V. Vitale, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 423 days.

(21) Appl. No.: 15/026,423

(22) PCT Filed: Oct. 8, 2014

(86) PCT No.: PCT/US2014/059602
§ 371 (c)(1),
(2) Date: Mar. 31, 2016

(87) PCT Pub. No.: WO2015/054334
PCT Pub. Date: Apr. 16, 2015

(65) Prior Publication Data
US 2016/0264251 A1    Sep. 15, 2016

Related U.S. Application Data

(60) Provisional application No. 61/888,266, filed on Oct. 8, 2013.

(51) Int. Cl.
*B64D 33/02*    (2006.01)
*B64D 41/00*    (2006.01)
(Continued)

(52) U.S. Cl.
CPC ............ *B64D 33/02* (2013.01); *B64D 15/16* (2013.01); *B64D 41/00* (2013.01); *F02C 7/045* (2013.01);
(Continued)

(58) Field of Classification Search
CPC .................. B64D 33/00; B64D 33/02; B64D 2033/0233; B64D 2033/213;
(Continued)

(56) References Cited

U.S. PATENT DOCUMENTS 2,381,705 A    8/1945    Vokes
4,346,860 A    8/1982    Tedstone
(Continued)

FOREIGN PATENT DOCUMENTS

GB    1212875 A    11/1970
GB    2155413 A    9/1985

OTHER PUBLICATIONS

International Preliminary Report on Patentability for International Application No. PCT/US2014/059602 dated Apr. 21, 2016.
(Continued)

*Primary Examiner* — Timothy D Collins
*Assistant Examiner* — Tye William Abell
(74) *Attorney, Agent, or Firm* — Carlson, Gaskey & Olds, P.C.

(57) ABSTRACT

An auxiliary power unit for an aircraft includes a turbine engine. An inlet includes an opening and a passageway between the opening and the turbine engine. An acoustic splitter is supported within the passageway for attenuating noise within the inlet. An inlet door is movable between a closed position and a fully open position. A portion of the inlet door aligns with a part of the passageway in at least a
(Continued)

first position and divides the passageway to deflect ice and noise in at least a second position. An air inlet and a method are also disclosed.

19 Claims, 4 Drawing Sheets

(51) Int. Cl.
    B64D 15/16      (2006.01)
    F02C 7/045      (2006.01)
    F02C 7/05       (2006.01)
    F02C 7/057      (2006.01)
(52) U.S. Cl.
    CPC ............... *F02C 7/05* (2013.01); *F02C 7/057* (2013.01); *B64D 2033/0206* (2013.01); *B64D 2033/0213* (2013.01); *B64D 2033/0233* (2013.01)
(58) Field of Classification Search
    CPC .. B64D 2033/206; B64D 41/00; B64D 15/16; F02C 7/05; F02C 7/045; F02C 7/057
    See application file for complete search history.

(56) References Cited

U.S. PATENT DOCUMENTS

| | | | |
|---|---|---|---|
| 5,140,819 A | 8/1992 | Napier et al. | |
| 6,247,668 B1* | 6/2001 | Reysa | B64D 41/00 244/53 B |
| 6,264,137 B1* | 7/2001 | Sheoran | B64D 33/02 244/53 B |
| 6,293,494 B1 | 9/2001 | Scherer et al. | |
| 6,349,899 B1* | 2/2002 | Ralston | B64D 33/02 244/53 B |
| 7,137,240 B2 | 11/2006 | Thompson | |
| 7,419,121 B2 | 9/2008 | Williams | |
| 7,469,565 B2 | 12/2008 | Nakaike et al. | |
| 7,578,369 B2 | 8/2009 | Francisco et al. | |
| 8,066,096 B1* | 11/2011 | Francisco | B64D 33/02 181/214 |
| 8,113,767 B2 | 2/2012 | Brill et al. | |
| 8,484,894 B2 | 7/2013 | Sakurai et al. | |
| 8,721,406 B2* | 5/2014 | Kastell | B64D 13/00 244/53 B |
| 8,740,135 B2 | 6/2014 | Light et al. | |
| 2005/0224635 A1* | 10/2005 | Hein | B64D 33/02 244/10 |
| 2006/0102779 A1 | 5/2006 | Campbell et al. | |
| 2006/0196993 A1* | 9/2006 | Hein | B64D 33/12 244/53 B |
| 2009/0152406 A1* | 6/2009 | Francisco | B64D 41/00 244/53 B |
| 2010/0068036 A1* | 3/2010 | Brill | B64D 41/00 415/119 |
| 2010/0221104 A1 | 9/2010 | Light et al. | |
| 2010/0307442 A1* | 12/2010 | Bolender | B64D 15/16 123/184.56 |
| 2012/0280088 A1* | 11/2012 | Sakurai | B64C 21/02 244/208 |
| 2012/0292455 A1* | 11/2012 | DeDe | B64D 41/00 244/53 B |
| 2013/0001369 A1* | 1/2013 | Light | B64D 41/00 244/53 B |
| 2013/0081706 A1 | 4/2013 | Garcia Nevado et al. | |
| 2016/0032757 A1* | 2/2016 | Liu | G01K 13/02 416/1 |

OTHER PUBLICATIONS

European Search Report for EP Application No. 14853060.3 dated May 12, 2017.
International Search Report and Written Opinion for International Application No. PCT/US2014/059602 dated Jan. 8, 2015.

* cited by examiner

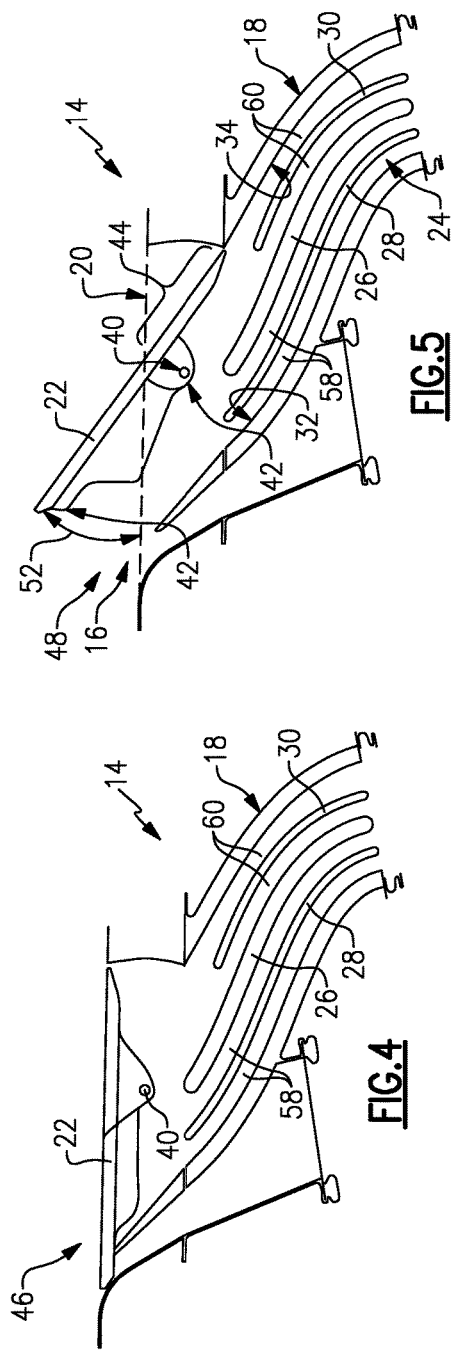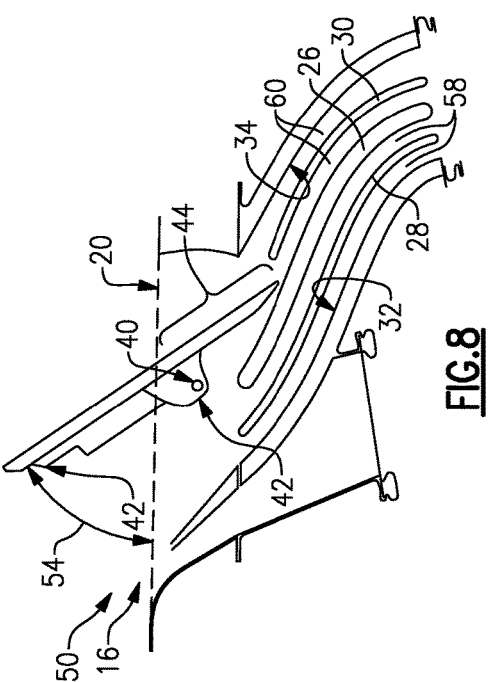

ACOUSTIC CONTROLLED ICE DEFLECTING AUXILIARY POWER UNIT INLET SYSTEM

CROSS-REFERENCE TO RELATED APPLICATION

This application claims priority to U.S. Provisional Application No. 61/888,266 filed on Oct. 8, 2013.

BACKGROUND

An Auxiliary power unit (APU) is provided in aircraft to provide power to aircraft systems to either supplement or substitute power generated by the main engines. An APU is typically a small gas turbine engine that is mounted within the aircraft fuselage and draws air through inlets defined within the outer skin of the aircraft. Because the APU is mounted within the aircraft fuselage, noise control features are provided to reduce noise communicated into the aircraft cabin and around the aircraft when on the ground or in the air. The inlets are open both during flight and while on the ground.

SUMMARY

An auxiliary power unit for an aircraft according to an exemplary embodiment of this disclosure, among other possible things includes a turbine engine. An inlet includes an opening and a passageway between the opening and the turbine engine. An acoustic splitter is supported within the passageway for attenuating noise within the inlet. An inlet door is movable between a closed position and a fully open position. A portion of the inlet door aligns with a part of the passageway in at least a first position and divides the passageway to deflect ice and noise in at least a second position.

In a further embodiment of the foregoing auxiliary power unit, in the second position includes an in-flight position and the inlet door is aligned with an aft wall of the passageway when in the in-flight position.

In a further embodiment of any of the foregoing auxiliary power units, in the acoustic splitter includes a plurality of splitters dividing the passageway into a plurality of channels for communicating air to the turbine engine.

In a further embodiment of any of the foregoing auxiliary power units, the second position includes an on-ground position and the plurality of splitters includes a central splitter. The inlet door aligns with the central splitter when in the on-ground position to divide the passageway into a forward portion that is forward of the inlet door and an aft portion that is aft of the inlet door.

In a further embodiment of any of the foregoing auxiliary power units, includes a forward splitter disposed within the passageway forward of the central splitter and an aft splitter disposed aft of the central splitter.

In a further embodiment of any of the foregoing auxiliary power units, the forward splitter, central splitter and aft splitter are of different lengths.

In a further embodiment of any of the foregoing auxiliary power units, the passageway defines a curved path and the forward splitter, central splitter, and aft splitters are curved to match the curved path.

In a further embodiment of any of the foregoing auxiliary power units, the passageway includes a forward wall, an aft wall, and first and second side walls transverse to the forward and aft walls and the acoustic splitter extends between the first and second side walls.

In a further embodiment of any of the foregoing auxiliary power units, the inlet door is movable about a pivot and the pivot is spaced apart from the forward wall and the aft wall.

In a further embodiment of any of the foregoing auxiliary power units, the inlet door defines an opening plane and the pivot is spaced apart from the opening plane.

In a further embodiment of any of the foregoing auxiliary power units, the inlet door includes a forward portion that is forward of the pivot and an aft portion that is aft of the pivot and the aft portion extends into the passageway when in the on-ground position.

An air inlet according to an exemplary embodiment of this disclosure, among other possible things includes an inlet including an opening and a passageway between the opening and the turbine engine. An acoustic splitter is supported within the passageway for attenuating noise within the inlet. An inlet door is movable between a closed position and a fully open position. A portion of the inlet door aligns with a part of the passageway in at least a first position and divides the passageway to deflect ice and noise in at least a second position.

In a further embodiment of the foregoing air inlet, in the first position, the inlet door is aligned with an aft wall of the passageway.

In a further embodiment of any of the foregoing air inlets, the acoustic splitter includes a plurality of splitters dividing the passageway into a plurality of channels.

In a further embodiment of any of the foregoing air inlets, the plurality of splitters includes a central splitter and the inlet door aligns with the central splitter when in the second position to divide the passageway into a forward portion that is forward of the inlet door and an aft portion that is aft of the inlet door.

In a further embodiment of any of the foregoing air inlets, includes a forward splitter disposed within the passageway forward of the central splitter and an aft splitter disposed aft of the central splitter.

In a further embodiment of any of the foregoing air inlets, the inlet door is movable about a pivot and includes a forward portion that is forward of the pivot and an aft portion that is aft of the pivot with the aft portion extending into the passageway when in the second position.

A method defining a passageway for communicating air to an auxiliary power unit mounted within an aircraft according to an exemplary embodiment of this disclosure, among other possible things includes defining an inlet including an opening and a passageway between the opening and a turbine engine, supporting an acoustic splitter within the passageway for attenuating noise propagation through the passageway, and supporting inlet door within the opening. The inlet door is configured to align with an aft wall of the passageway in as least a first position and to align with a portion of the acoustic splitter to divide the passageway in a second position.

In a further embodiment of the foregoing method, moving the inlet door to first position includes opening the inlet door such that a forward portion of the inlet door is disposed at a first angle, and moving the inlet door to the second position includes moving the forward portion of the inlet door to a second angle that is greater than the first angle.

In a further embodiment of any of the foregoing methods, includes shielding an aft portion of the passageway with the inlet door when in the inlet door is in the second position.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a cross section of the inlet in a closed position according to an embodiment.

FIG. 5 is a cross section of the inlet in an inflight position according to an embodiment.

FIG. 8 is a schematic view of the inlet with the inlet door in the on ground position according to an embodiment.

DETAILED DESCRIPTION

A disclosed auxiliary power unit (APU) air inlet configuration provides optimal engine performance from a pressure drop and distortion perspective, as well as provides desired acoustic performance. Moreover, the example air inlet configuration avoids ice build-up that has the risk of causing an APU surge event.

Figure 1:
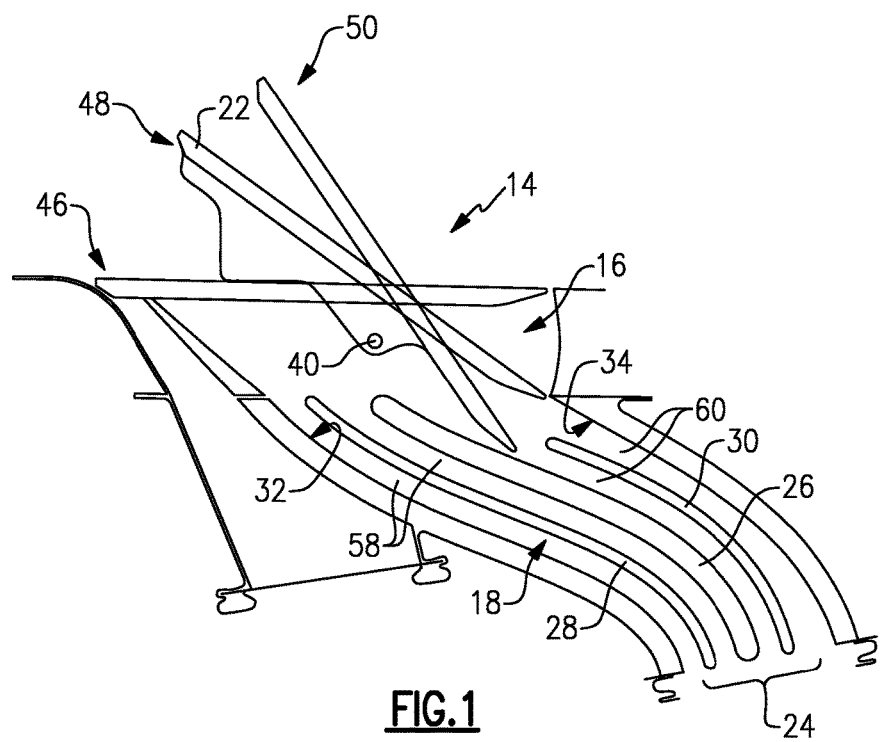
FIG. 1 is a cross section of an inlet for an auxiliary power unit according to an embodiment.
Figure 2:
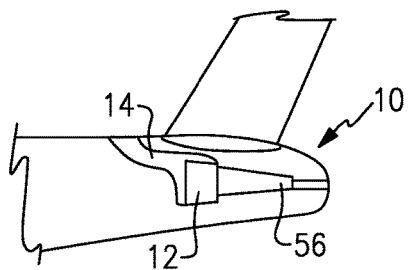
FIG. 2 is a schematic view of an aircraft including an auxiliary power unit according to an embodiment.
Figure 3:
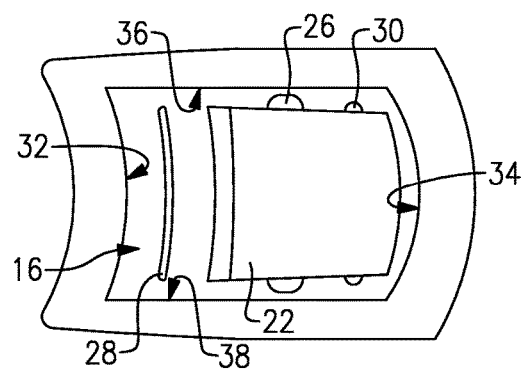
FIG. 3 is a downward looking view of the example inlet for the auxiliary power unit according to an embodiment.

Referring to FIGS. 1, 2 and 3, an example inlet assembly 14 for an auxiliary power unit (APU) 12 defines a passageway 18 for airflow to an auxiliary power unit 12 mounted within an aircraft 10. The inlet assembly 14 includes an inlet door 22 movable between a fully closed position and a fully open position. In this example, the APU 12 is a gas turbine engine that is mounted within a tail portion of an aircraft 10 that generates a high energy exhaust gas flow that is ultimately channeled through an exhaust port 56 outboard of the aircraft 10. The APU 12 may power a generator or other device on-board the aircraft. It should be understood that although the example APU 12 is illustrated schematically as being mounted within a tail portion of an aircraft 10 that it is within the contemplation of this disclosure that the inlet assembly 14 can be utilized to provide airflow to an APU mounted in other portions of an example aircraft 10.

The inlet door 22 is moveable about a pivot 40 between a closed position 46, an inflight position 48 and a fully open or on ground position 50, all shown schematically in FIG. 1. The inlet door 22 is moveable to any position between the closed position 46 and the fully open on ground position 50. The inlet assembly 14 includes an opening 16 within which the inlet door 22 is moveable. The opening 16 is in communication with the passageway 18. The passageway 18 defines a path for airflow from the opening 16 to the APU 12.

The example passageway 18 includes acoustic splitter assembly 24. The acoustic splitter assembly 24 extends through the passageway 18 to subdivide the passage and substantially reduce propagation of vibrations and/or noise generated by the APU 12 out the opening 16.

In this example, the acoustic splitter assembly 24 includes a central splitter 26, a forward splitter 28 and an aft splitter 30. The example splitters 26, 28, 30 define forward channels 58 and aft channels 60. The forward channels 58 are defined between the central splitter 26, the forward splitter 28 and a forward wall 32 of the passage 18. The aft channels 60 are defined between the central splitter 26, the aft splitter 30 and the aft wall 34. It should be understood that although the example acoustic splitter assembly 24 is illustrated including three splitter portions, additional splitters and configurations could be utilized and are within the contemplation of this disclosure. The example splitters 26, 28, 30 extend between a first sidewall 38 and a second sidewall 36 to divide the passageway 18 into the channels 58 and 60.

The inlet door 22 is moveable within the opening 16 to provide airflow to the APU 12 during different operational conditions. The APU 12 is required to operate during in flight conditions and also during on ground conditions. The airflow requirements of the auxiliary power unit 12 may vary during these operations and therefore the inlet door 22 is moveable to the various positions to provide the desired airflow during these conditions.

Referring to FIG. 4, the inlet door 22 is shown in the closed position 46 where no airflow is provided through the passageway 18. In this position, the inlet door 22 is substantially flush with the exterior surface of the aircraft.

Figure 6:
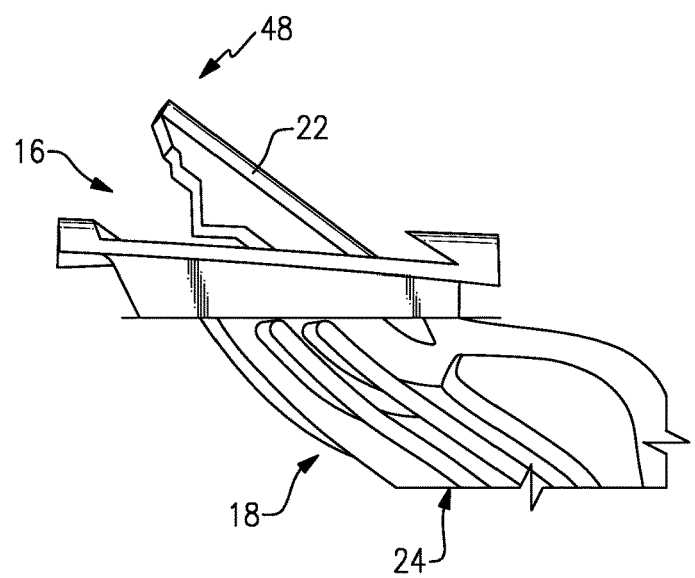
FIG. 6 is a cross-sectional schematic view of the inlet in the inflight condition according to an embodiment.
Figure 7:
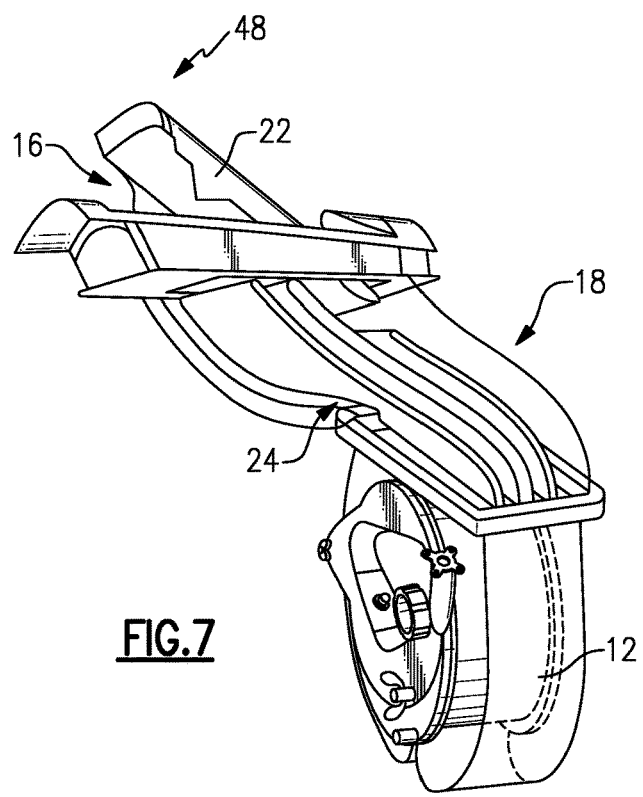
FIG. 7 is a perspective view of the inlet and passage with the inlet door in the inflight position according to an embodiment.

Referring to FIGS. 5, 6 and 7, the inlet door 22 is illustrated in an inflight position 48. In the inflight position 48, the inlet door 22 is rotated such that an aft portion 44 is aligned with an aft wall 34 of the passage 18. In this position, the entire passageway 18 is open to a forward portion of the opening 16. The aft portion 44 of the inlet door 22 rotates inwardly through the opening 16 and partially into the passage 18. A forward portion 42 of the inlet door 22 opens at an angle 52 relative to an opening plane 20 to provide a scoop like opening that is operable during flight. In this position, airflow is scooped and directed into the passage 18 and thereby to the auxiliary power unit 12.

The pivot 40 is spaced apart from the opening plane 20 inwardly toward the passage 18. The pivot 40 is also spaced apart from the forward wall 32 and aft wall 34 of the passageway 18. Accordingly, the position of the pivot 40 enables rotation of the inlet door 22 such that the aft portion 44 moves inward into the passage 18 and the forward portion 42 moves outwardly from the opening plane 20 to a position defined by the angle 52.

Figure 9:
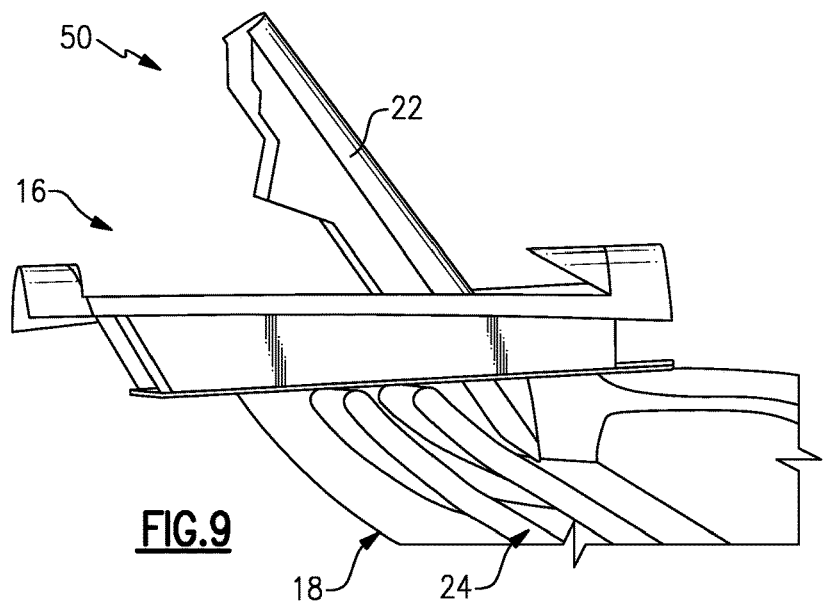
FIG. 9 is a cross section of the inlet with the inlet door in the on ground position according to an embodiment.
Figure 10:
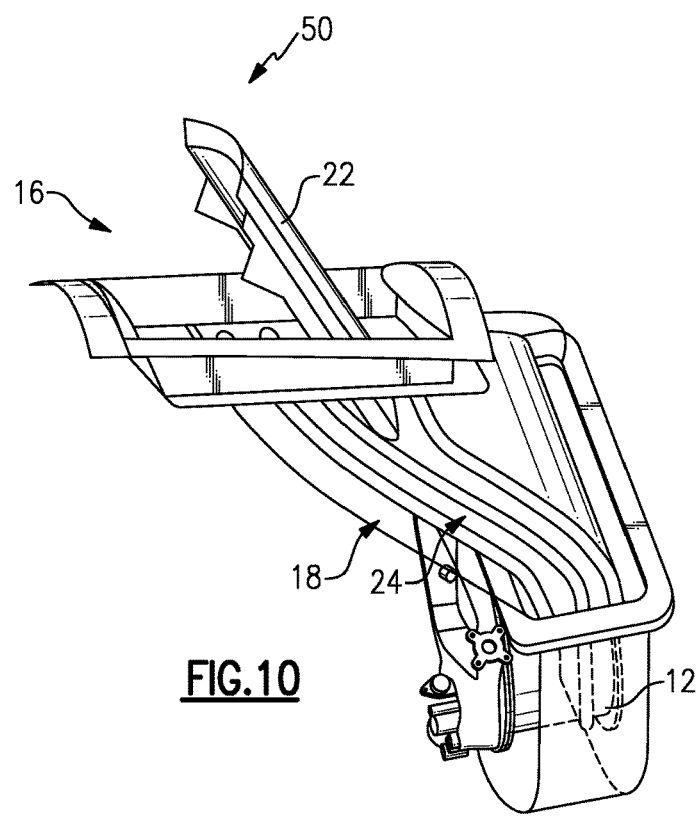
FIG. 10 is a perspective view of the inlet and passageway with the inlet door in the on ground position according to an embodiment.

Referring to FIGS. 8, 9 and 10, the example inlet 14 is illustrated within the inlet door 22 moved to an on ground position. In the on ground position 50, the inlet door 22 is rotated about the pivot 40 such that the aft portion 44 aligns with the central splitter 26. Alignment of the aft portion 44 of the inlet door 22 with the central splitter 26 effectively divides the air flow into the passageway 18 into a forward portion and an aft portion. The further rotation of the inlet door 22 about the pivot 40 into the passage 18 opens the forward portion 42 of the inlet door 22 at an angle 54. The angle 54 is greater than the angle 52 of the inlet door when in the inflight condition.

Because the inlet door 22 divides the passageway 18 into a forward portion and an aft portion that corresponds to forward channels 58 and aft channels 60, a protected portion of the inlet assembly 14 is created that protects against the buildup of ice flow throughout the entire passageway. The divided passageway 18 provided by the on ground position of the inlet door 22 provides a much larger opening for air flow that is much more tolerant of ice buildup as compared to the inflight position of the inlet door 22 illustrated in FIGS. 5, 6 and 7. Moreover, the aft portion 44 of the inlet door 22 blocks propagation of noise when on the ground to further aid in providing desired performance and acoustic properties of the example auxiliary power unit 12.

The example inlet door 22 is movable about the pivot 40 that provides a hinge line such that the aft portion 44, when actuated open, swings inside the passageway 18. The disclosed inlet door positions, in combination with the acoustic splitter assembly 24, provides an inlet assembly 14 that, in some positions, blocks at least a portion of noise from the APU from reaching the nearest service point to meet desired noise requirements. Additionally, the example inlet door 22 provides a "protected" part of the inlet assembly 14 that has significantly less risk of being covered with ice. The example inlet assembly 14 provides a creative way to keep a portion of the passageway 18 open during severe icing conditions, which allows for proper operation of the APU 12.

Accordingly, the disclosed APU inlet assembly 14 performs as a scoop in one condition, and a shield in another, while also offering acoustic benefits and preventing ice build-up. The inlet assembly 14 further provides a compact design that is compatible with installation in small spaces.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An auxiliary power unit for an aircraft comprising:
   a turbine engine;
   an inlet including an opening and a passageway between the opening and the turbine engine;
   an acoustic splitter supported within the passageway for attenuating noise within the inlet;
   an inlet door movable between a closed position and a fully open position, wherein a portion of the inlet door aligns with an aft wall of the passageway in at least a first position and to align with a portion of the acoustic splitter to divide the passageway to deflect ice and noise in at least a second position.

2. The auxiliary power unit as recited in claim 1, wherein in the first position comprises an in-flight position.

3. The auxiliary power unit as recited in claim 1, wherein the acoustic splitter comprises a plurality of splitters dividing the passageway into a plurality of channels for communicating air to the turbine engine.

4. The auxiliary power unit as recited in claim 3, wherein the second position comprises an on-ground position and the plurality of splitters comprises a central splitter, wherein the inlet door aligns with the central splitter when in the on-ground position to divide the passageway into a forward portion that is forward of the inlet door and an aft portion that is aft of the inlet door.

5. The auxiliary power unit as recited in claim 4, including a forward splitter disposed within the passageway forward of the central splitter and an aft splitter disposed aft of the central splitter.

6. The auxiliary power unit as recited in claim 5, wherein the forward splitter, central splitter and aft splitter are of different lengths.

7. The auxiliary power unit as recited in claim 5, wherein the passageway defines a curved path and the forward splitter, central splitter, and aft splitters are curved to match the curved path.

8. The auxiliary power unit as recited in claim 1, wherein the passageway includes a forward wall, an aft wall, and first and second side walls transverse to the forward and aft walls and the acoustic splitter extends between the first and second side walls.

9. The auxiliary power unit as recited in claim 8, wherein the inlet door is movable about a pivot and the pivot is spaced apart from the forward wall and the aft wall.

10. The auxiliary power unit as recited in claim 9, wherein the inlet door defines an opening plane and the pivot is spaced apart from the opening plane.

11. The auxiliary power unit as recited in claim 9, wherein the inlet door includes a forward portion that is forward of the pivot and an aft portion that is aft of the pivot and the aft portion extends into the passageway when in the second position.

12. An air inlet for turbine engine comprising:
    an inlet including an opening and a passageway between the opening and the turbine engine;
    an acoustic splitter supported within the passageway for attenuating noise within the inlet; and
    an inlet door movable between a closed position and a fully open position, wherein a portion of the inlet door aligns with an aft wall of the passageway in at least a first position and aligns the inlet door with a portion of the acoustic splitter within the passageway to deflect ice and noise in at least a second position.

13. The air inlet as recited in claim 12, wherein the acoustic splitter comprises a plurality of splitters dividing the passageway into a plurality of channels.

14. The air inlet as recited in claim 13, wherein the plurality of splitters comprises a central splitter and the inlet door aligns with the central splitter when in the second position to divide the passageway into a forward portion that is forward of the inlet door and an aft portion that is aft of the inlet door.

15. The air inlet as recited in claim 14, including a forward splitter disposed within the passageway forward of the central splitter and an aft splitter disposed aft of the central splitter.

16. The air inlet as recited in claim 12, wherein the inlet door is movable about a pivot and includes a forward portion that is forward of the pivot and an aft portion that is aft of the pivot with the aft portion extending into the passageway when in the second position.

17. A method defining a passageway for communicating air to an auxiliary power unit mounted within an aircraft, the method comprising:
    defining an inlet including an opening and a passageway between the opening and a turbine engine;
    supporting an acoustic splitter within the passageway for attenuating noise propagation through the passageway; and
    supporting inlet door within the opening, the inlet door configured to align with an aft wall of the passageway in as least a first position and to align with a portion of the acoustic splitter to divide the passageway in a second position.

18. The method as recited in claim 17, wherein moving the inlet door to first position includes opening the inlet door such that a forward portion of the inlet door is disposed at a first angle, and moving the inlet door to the second position includes moving the forward portion of the inlet door to a second angle that is greater than the first angle.

19. The method as recited in claim 17, including shielding an aft portion of the passageway with the inlet door when in the inlet door is in the second position.

* * * * *